United States Patent [19]

Sygnator

[11] Patent Number: 4,927,309
[45] Date of Patent: May 22, 1990

[54] WIRE NAIL

[76] Inventor: Henry A. Sygnator, 22 S. Ridge Ave., Arlington Hts., Ill. 60005

[21] Appl. No.: 348,732

[22] Filed: May 8, 1989

[51] Int. Cl.⁵ .............................................. F16B 15/00
[52] U.S. Cl. .................................... 411/439; 411/493; 411/496; 411/498; 411/499
[58] Field of Search ............... 411/439, 446, 451, 452, 411/487, 488, 489, 491, 492, 493, 494, 496, 498, 499, 490, 456

[56] References Cited

U.S. PATENT DOCUMENTS

| | | |
|---|---|---|
| 376,791 | 1/1888 | Sweet . |
| 391,109 | 10/1888 | Bellanger ............................ 411/451 |
| 490,439 | 1/1893 | Howes . |
| 502,550 | 8/1893 | Curtis . |
| 681,143 | 8/1901 | Slocomb . |
| 886,980 | 5/1908 | Horner ........................... 411/493 X |
| 1,042,301 | 10/1912 | Welsch . |
| 1,109,328 | 9/1914 | Evans . |
| 1,193,503 | 8/1916 | Braddock . |
| 1,623,465 | 4/1927 | Curtis . |
| 1,761,119 | 6/1930 | Gouldbourn . |
| 1,933,317 | 10/1933 | Curtis ................................... 411/451 |
| 2,128,798 | 8/1938 | Burr . |
| 2,212,787 | 8/1940 | Miller . |
| 2,613,570 | 10/1952 | Sokolik . |
| 2,808,721 | 10/1957 | Strimel . |
| 3,966,042 | 6/1976 | Shelton et al. . |
| 4,755,091 | 7/1988 | Potucek et al. . |

OTHER PUBLICATIONS

International Staple, Nail & Tool Association, Bulletin No. UM-25d.
U.S.D.A., Wood Handbook, Agricultural Handbook 72 (revised 1987).

Primary Examiner—Rodney M. Lindsey

[57] ABSTRACT

A wire nail having a shank, a head formed on one end of the shank, and a point formed on the other end. The point has a penetrating portion, a wedging portion, and a transitional portion. The wedging portion defines four straight edges, each being inclined at an acute angle relative to an axis defined by the shank. The transitional portion defines four straight edges, each meeting a different one of said edges defined by the wedging portion, and each being inclined at a lesser angle relative to the same axis. The wedging portion has a plurality of convex surfaces, each conforming generally to a section of a circular cylinder. The transitional portion has a plurality of convex surfaces, each conforming generally to a section of a circular cylinder. A cutting tip is formed as a thin rib extended across the penetrating portion. A pair of thin cutting ribs extended from the cutting tip are formed along the wedging and transitional portions.

13 Claims, 2 Drawing Sheets

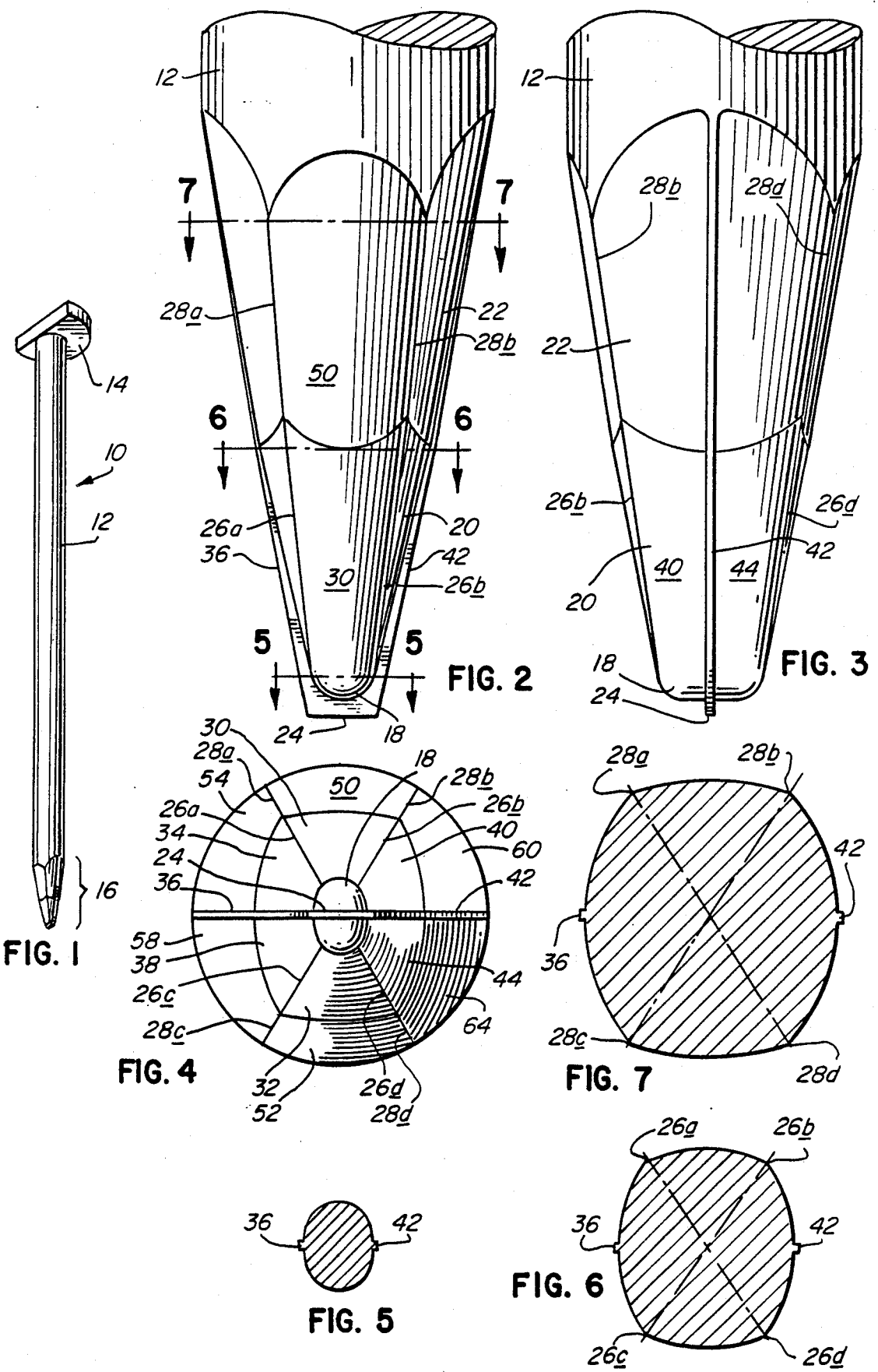

WIRE NAIL

TECHNICAL FIELD OF THE INVENTION

This invention pertains to wire nails, particularly but not exclusively wire nails designed to be forceably driven by pneumatically powered or combustion-powered nailing tools.

BACKGROUND OF THE INVENTION

For many years, wire nails have been used in countless numbers for wood-fastening and other applications. Pneumatically powered nailing tools and, in recent years, combustion-powered nailing tools have been used extensively to drive such nails.

Typically, wire nails are made from steel wire with a shank defining an axis, a head formed on one end of the shank, and a point formed on the other end of the shank. Although various points have been known, a standard point has evolved, which is characterized by four flat, triangular facets, each lying in a plane oriented at an angle of about 20° relative to an axis defined by the shank. Such a point tends to be quite sharp.

Many efforts have been made to increase the resistance of such nails to withdrawal. Such efforts have been focused primarily on their shanks, which consequently have been coated, etched, spirally grooved, annularly grooved, or barbed, so as to increase their resistance to withdrawal. Diverse coating agents have been used to increase such resistance, e.g., poly(vinyl acetate). Blunt-pointed nails have been used to minimize splitting of wood.

Although wire nails as known heretofore have proved to be generally satisfactory for many applications, their utility would be greatly enhanced if their resistance to withdrawal could be further increased.

SUMMARY OF THE INVENTION

Surprisingly, it has been found that point geometry of a nail has a significant effect on the resistance of the nail to withdrawal, whether or not the shank of the nail has been coated. Accordingly, this invention provides a wire nail having a novel point and tending to have greater resistance to withdrawal, when tested with different types of wood, as compared to a wire nail having a standard point.

The wire nail provided by this invention is similar to prior nails in having a shank, which defines an axis, a head, which is formed on one end of the shank, and a point, which is formed on the other end of the shank. The shank may be optionally coated, etched, spirally grooved, annularly grooved, or barbed, as mentioned above. Preferably a portion of the shank is circular in cross-section, up to the end on which the point is formed. The head may conform to the heads of prior nails. However, the point differs significantly from a standard point, as mentioned above, and from other known points.

Specifically, the point has a penetrating portion, a wedging portion, and a transitional portion. The penetrating portion is blunt, although a cutting tip may be optionally formed on the penetrating portion, as mentioned below. The wedging portion merges with and tapers toward the penetrating portion. The transitional portion merges with and tapers toward the wedging portion and merges with the shank end on which the point is formed.

The wedging portion defines plural straight edges, preferably four straight edges, each of which is inclined at a given angle relative to the axis defined by the shank, preferably an acute angle relative to the axis defined by the shank.

Preferably, the acute angle is about 12½°; i.e., 12.5°. Although four such edges are preferred, it is contemplated that two, three, or more than four such edges may be alternatively used.

The transitional portion defines plural straight edges, preferably four straight edges, each of which meets a different one of such edges defined by the wedging portion, and each of which is inclined at a lesser angle relative to the angle defined by the shank. Preferably, the lesser angle is about 10°. Although four such edges are preferred, it is contemplated that two, three, or more than four such edges may be alternatively used.

The wedging portion has a plurality of convex surfaces. Each such surface conforms generally to a section of a circular cylinder, preferably a circular cylinder defining a central axis passing through the wire nail. Two such surfaces meet at each of such edges defined by the wedging portion.

The transitional portion has a plurality of convex surfaces. Each such surface on the transitional portion conforms generally to a section of a circular cylinder, preferably a cylinder defining a central axis passing through the wire nail. Two such surfaces of the transitional portion meet at each of such edges defined by the transitional portion.

Preferably, each of the penetrating, wedging, and transitional portions of the point is elongate in cross-section, and asymmetrical about the axis defined by the shank.

Preferably, as mentioned above, a cutting tip is formed on the penetrating portion. The cutting tip may be advantageously formed on the penetrating portion as a thin rib extending across the penetrating portion.

If a cutting tip is formed as mentioned above, the wire nail may have a pair of cutting ribs extended from the cutting tip and formed along the wedging portion, preferably between two of such edges defined by the wedging portion. Such ribs may be also formed along the transitional portion, preferably between two of such edges defined by the transitional portion.

A wire nail according to this invention tends to exhibit greater resistance to withdrawal, when tested with different woods, as compared to a wire nail having a standard point.

Wire nails according to this invention can be suitably collated, in known ways, so as to be particularly useful with pneumatically powered and combustion-powered nailing tools having suitable magazines.

These and other objects, features, and advantages of this invention are evident from the following description of the preferred embodiment of this invention, with reference to the accompanying drawing.

BRIEF DESCRIPTION OF THE DRAWING

FIG. 1 is a perspective view of the wire nail constituting a preferred embodiment of this invention. The wire nail is shown as having a cylindrical shank, a D-shaped head formed on one end of the shank, and a novel point formed on the other end of the shank.

FIGS. 2 and 3 are greatly enlarged, fragmentary, elevational views, which are taken in mutually orthogonal directions, and which show details of the novel point.

FIG. 4 is an end view which is taken in a direction facing the novel point.

FIGS. 5, 6, 7 are sectional views which are taken respectively along lines 5—5, 6—6, and 7—7 in FIG. 2, each in a direction indicated by arrows.

DETAILED DESCRIPTION OF PREFERRED EMBODIMENT

Figure 8A:
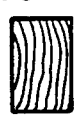
FIGS. 8A, 8B, 8C and 8D are end views of wood boards differing from other in grain structures.

As shown in FIG. 1, a wire nail 10 constituting a preferred embodiment of this invention has a shank 12, a head 14 formed on one end of the shank 12, and a point 16 formed on the other end of the shank 12. The head 14 and the point 16 may be die-formed on opposite ends of the shank 12 in a nail-making machine (not shown) of a known type, e.g., a Wafios Model N51 Nail-Making Machine, as available commercially from Wafios Maschinenfabrik GmbH & Co. KG of Reuthingen, Federal Republic of Germany.

The shank 12 conforms generally to a circular cylinder of a given diameter (e.g., 0.1285 in.) and defines an axis, which is the central axis of such cylinder. Two points on such axis are indicated in the drawing, namely, where such axis passes through an intersection of two straight (phantom) lines shown in FIG. 7 and where such axis passes through an intersection of two straight (phantom) lines shown in FIG. 6. The shank 12 may be optionally coated, etched, spirally grooved, annularly grooved, or barbed, as mentioned above, so as to increase the resistance of the wire nail 10 to withdrawal.

The head 14 is D-shaped, as shown in FIG. 1. Thus, the wire nail 10 and like nails (not shown) may be compactly collated, in known ways, so as to be particularly useful in a pneumatically powered or combustion-powered nailing tool (not shown) having a suitable magazine (not shown) to receive a collated strip of such nails. See, e.g., Shelton et al. U.S. Pat. No. 3,966,042 for an example of a compactly collated strip of wire nails having D-shaped heads.

The point 16 differs significantly from a standard point, and from other known points, and has a penetrating portion 18, a wedging portion 20, and a transitional portion 22. The penetrating portion 18 is rounded, and blunt, except for a thin rib 24 to be later described. The wedging portion 20 merges with and tapers toward the penetrating portion 18. The transitional portion 22 merges and tapers toward the wedging portion 20 and merges with one end of the shank 12, i.e., the end on which the point 16 is formed.

The wedging portion 20 defines four straight edges 26a, 26b, 26c, 26d, each of which is inclined on an acute angle of about 12½° relative to the axis defined by the shank 12. The transitional portion 22 defines four straight edges 28a, 28b, 28c, 28d, each of which is inclined at a lesser angle of about 10° relative to the axis defined by the shank 12. The edge 28a of the transitional portion 22 meets the edge 26a of the wedging portion 20. Also, the edge 28b meets the edge 26b, the edge 28c meets the edge 26c and the edge 28d meets the edge 26d.

The wedging portion 20 has a convex surface 30, which is bounded laterally by the edges 26a, 26b, and a convex surface 32, which is bounded laterally by the edges 26c, 26d, as well as a convex surface 34, which is bounded laterally by the edge 26a and by a rib 36 to be later described, and a convex surface 38, which is bounded laterally by the edge 26c and by the rib 36. The wedging portion 20 also has a convex surface 40, which is bounded laterally by the edge 26b and by a rib 42, to be later described, and a convex surface 44, which is bounded laterally by the edge 26d and by the rib 42. Each of such surfaces 30, 32, 34, 38, 40, 44 conforms generally to a section of a circular cylinder of a given radius (e.g., 0.064 in.) which is equal for each of such surfaces 30, 32, 34, 38, 40, 44.

The transitional portion 22 has a convex surface 50, which is bounded laterally by the edges 28a, 28b, and a convex surface 52, which is bounded laterally by the edges 28c, 28d, as well as a convex surface 54, which is bounded laterally by the edges 28a and by the rib 36, and a convex surface 58, which is bounded by the edge 28c and by the rib 36. The transitional portion 22 also has a convex surface 60 which is bounded laterally by the edge 28b and by the rib 42, and a convex surface 64, which is bounded laterally by the edge 28d and by the rib 42. Each of such surfaces 50, 52, 54, 58, 60, 64, conforms generally to a section of a circular cylinder of a larger radius (e.g., 0.096 in.) which is equal for each of such surfaces 50, 52, 54, 58, 60, 64, and which is larger than the given radius for each of the convex surfaces of the wedging portion.

Each of the penetrating, wedging, and transitional portions of the point 16 is elongate in cross-section, and asymmetrical about the axis defined by the shank 12, as shown in FIGS. 5 through 7. Thus, in any cross-sectional plane taken through the wedging portion 20 and in normal relation to the axis defined by the shank 12 (see, e.g., FIG. 6) a straight line connecting the edges 26a, 26d, and a straight line connecting the edges 26b, 26c, intersect (at the axis defined by the shank 12) at unequal supplementary angles of about 60°, 120°. Also, in any cross-sectional plane through the transitional portion 22 and in normal relation to the axis defined by the shank 12 (see, e.g., FIG. 7) a straight line connecting the edges 28a, 28d, and a straight line connecting edges 28b, 28c, intersect (at the axis defined by the shank 12) at unequal supplementary angles of about 60°, 120°.

As mentioned above, a cutting tip is formed on the penetrating portion 18, as a thin cutting rib 24 formed with substantially square (about 90°) edges and extended across the penetrating portion 18 at the narrowest dimension of such portion 18. As mentioned above, a pair of thin cutting ribs 36, 42, are formed with substantially square edges (about 90°) and extend to opposite ends of the rib 24 (with which the ribs 36, 42, merge at a cross-sectional plane through line 5—5 of FIG. 2) along the wedging portion 20, the rib 36 extending about equally between the edges 26a, 26c, and the rib 42 extending about equally between the edges 26b, 26d, and along the transitional portion 22, the rib 36 extending about equally between the edges 28a, 28c, and the rib 42 extending about equally between the edges 28b, 28d.

Preferably, the cutting rib 24 forming the cutting tip and the cutting ribs 36, 42, have a uniform thickness of about 0.003 inch, and the cutting rib 24 forming the cutting tip extends axially by about 0.01 inch. Preferably, except for the cutting rib 24 forming the cutting tip, the point 16 has an axial length of about 0.255 inch, except for the cutting rib 24 forming the cutting tip, there is an axial distance of about 0.2 inch between a cross-sectional plane through line 7—7 of FIG. 2 and the extreme end of the penetrating portion 18, and there is an axial length of about 0.1 inch between a cross-sectional plane through line 6—6 of FIG. 2 and the extreme end of the penetrating portion 18.

Such a nail is susceptible to various dimensional, proportional, and other modifications without departing from the scope and spirit of this invention.

COMPARATIVE EXAMPLES

Tests were conducted to compare wire nails according to the preferred embodiment of this invention, as described above, and wire nails according to the prior art, as formed with standard points. As mentioned above, a standard point is characterized by four flat, triangular facets, each lying in a plane oriented at an angle of about 20° relative to the axis defined by the shank of the nail having such a point, and such a point tends to be quite sharp.

As tested, such nails according to the preferred embodiment of this invention and such nails according to the prior art were similar, except for their points. Each measured about 3.0 inches in its overall length and had a shank diameter of about 0.131 inch. Each was coated similarly, along its point and adjacent portions of its shank so as to have a coated length of about 1.25 inches, with Inducote TM 13-076 poly(vinyl acetate) coating material, as available commercially from Finnaren & Haley, Inc., of Conshohocken, Pennsylvania.

EXAMPLE ONE

S-P-F Tests

Figure 8B:
Figure 8C:
Figure 8D:

A first group of such nails according to the preferred embodiment of this invention and a first group of such nails according to the prior art were driven into S-P-F boards. Here "S-P-F" is an art-recognized term for certain Spruce, Pine, and Fir species having specific gravities within narrow ranges; see International Staple, Nail and Tool Association, Bulletin No. UM-25d (undated). The S-P-F boards were selected to have close similarities in grain structure, which was judged visually at the board ends, in specific gravity, which ranged from about 0.39 to about 0.43 inclusive, and in moisture content, which ranged from about 7.5% to about 10% inclusive. Each such S-P-F board had a grain structure similar to the grain structure shown in FIG. 8B; boards having grain structures similar to any of the grain structures shown in FIGS. 8A, 8C, and 8D were rejected.

Two nails from the first group of such nails according to the preferred embodiment of this invention and two nails from the first group of such nails according to the prior art were driven into each of fifteen such S-P-F boards. Each such nail was driven by a Paslode TM Model 5350S pneumatically powered nailing tool. The same tool, which was operated at a tool pressure of 100 psi, was used to drive each such nail. Paslode TM Model 5350S pneumatically powered nailing tools are available commercially from ITW-Paslode of Lincolnshire, Illinois.

Withdrawal force for each such nail was measured within a few hours after such same nail had been driven, by a Tinius Olsen Model Super "L" testing machine, as available commercially from Tinius Olsen Testing Machine Company, of Willow Grove, Pennsylvania. See Strimel U.S. Pat. No. 2,808,721 for a description of such a machine.

Wood conditions were as tabulated in Table A below.

TABLE A

| | Board No. | | | | | | | |
| --- | --- | --- | --- | --- | --- | --- | --- | --- |
| | 1 | 2 | 3 | 4 | 5 | 6 | 7 | 8 |
| Moisture (%) | 10.0 | 9.5 | 9.5 | 10.0 | 8.5 | 8.5 | 7.5 | 9.0 |
| Specific Gravity | 0.42 | 0.43 | 0.43 | 0.41 | 0.40 | 0.41 | 0.43 | 0.41 |

| | Board No. | | | | | | |
| --- | --- | --- | --- | --- | --- | --- | --- |
| | 9 | 10 | 11 | 12 | 13 | 14 | 15 |
| Moisture (%) | 8.5 | 10.0 | 9.5 | 10.0 | 8.5 | 9.0 | 7.5 |
| Specific Gravity | 0.39 | 0.41 | 0.41 | 0.39 | 0.39 | 0.38 | 0.40 |

Figure 9:
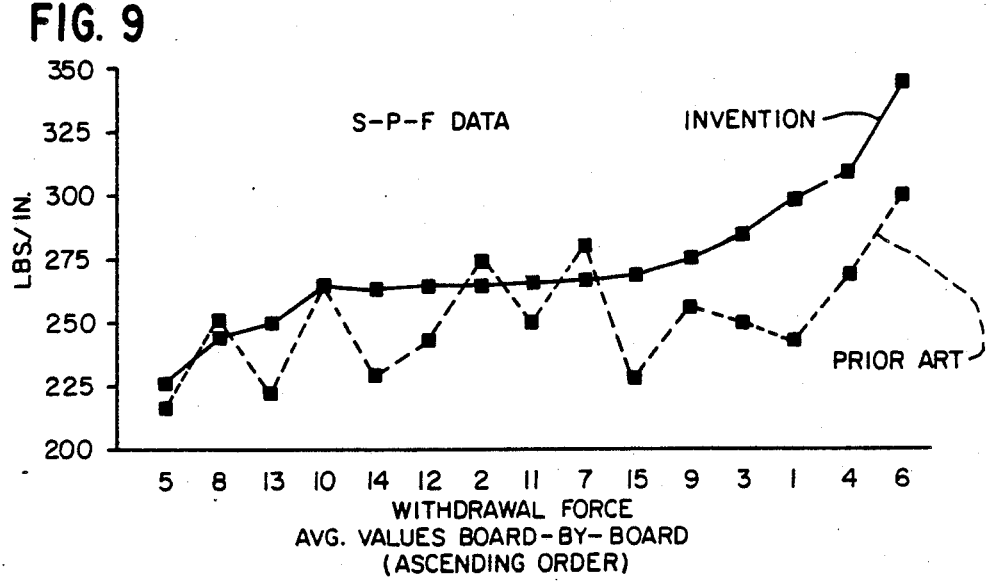
FIGS. 9 and 10 are graphical representations of certain data obtained in certain tests.

The data tabulated in Tables B and C below were obtained. No wood splits, head popping, or shank breaking were observed. Some of such data are abstracted in FIG. 9, which plots average (mean) values of withdrawal forces (in pounds per inch) for individual S-P-F boards, in ascending order, and in which the upper plot represents such values (in ascending order) for the S-P-F boards and tested nails according to the preferred embodiment of this invention, and in which the lower plot represents such values for the same boards and tested nails according to the prior art.

TABLE B

| | S-P-F TESTS - FIRST GROUP OF WIRE NAILS ACCORDING TO PREFERRED EMBODIMENT OF THIS INVENTION | | | | | |
| --- | --- | --- | --- | --- | --- | --- |
| NAIL SAMPLE NUMBER | S-P-F BOARD NUMBER | FASTENER LENGTH (IN.) | STANDING HEIGHT (IN.) | PENETRATION DEPTH (IN.) | ULTIMATE PULL-OUT VALUE (LBS.) | ADJUSTED PULL-OUT VALUE* (LBS./IN.) |
| 1 | 1 | 3.01 | 0.72 | 2.29 | 689 | 301 |
| 2 | 1 | 3.01 | 0.72 | 2.29 | 695 | 303 |
| 3 | 2 | 3.01 | 0.74 | 2.27 | 622 | 274 |
| 4 | 2 | 3.01 | 0.75 | 2.26 | 588 | 260 |
| 5 | 3 | 3.01 | 0.73 | 2.28 | 722 | 317 |
| 6 | 3 | 3.01 | 0.72 | 2.29 | 594 | 259 |
| 7 | 4 | 3.01 | 0.73 | 2.28 | 773 | 339 |
| 8 | 4 | 3.01 | 0.74 | 2.27 | 652 | 287 |
| 9 | 5 | 3.01 | 0.72 | 2.29 | 517 | 226 |
| 10 | 5 | 3.01 | 0.73 | 2.28 | 518 | 227 |
| 11 | 6 | 3.01 | 0.70 | 2.31 | 736 | 319 |
| 12 | 6 | 3.01 | 0.74 | 2.27 | 862 | 380 |
| 13 | 7 | 3.01 | 0.72 | 2.29 | 577 | 252 |
| 14 | 7 | 3.01 | 0.74 | 2.27 | 652 | 287 |
| 15 | 8 | 3.01 | 0.68 | 2.33 | 506 | 217 |
| 16 | 8 | 3.00 | 0.71 | 2.29 | 624 | 272 |
| 17 | 9 | 3.01 | 0.69 | 2.32 | 624 | 269 |
| 18 | 9 | 3.00 | 0.69 | 2.31 | 665 | 288 |

TABLE B-continued
S-P-F TESTS - FIRST GROUP OF WIRE NAILS ACCORDING TO PREFERRED EMBODIMENT OF THIS INVENTION

| NAIL SAMPLE NUMBER | S-P-F BOARD NUMBER | FASTENER LENGTH (IN.) | STANDING HEIGHT (IN.) | PENETRATION DEPTH (IN.) | ULTIMATE PULL-OUT VALUE (LBS.) | ADJUSTED PULL-OUT VALUE* (LBS./IN.) |
|---|---|---|---|---|---|---|
| 19 | 10 | 3.01 | 0.69 | 2.32 | 613 | 264 |
| 20 | 10 | 3.01 | 0.71 | 2.30 | 608 | 264 |
| 21 | 11 | 3.01 | 0.70 | 2.31 | 602 | 261 |
| 22 | 11 | 3.01 | 0.70 | 2.31 | 634 | 275 |
| 23 | 12 | 3.01 | 0.70 | 2.31 | 647 | 280 |
| 24 | 12 | 3.00 | 0.68 | 2.32 | 586 | 253 |
| 25 | 13 | 3.00 | 0.68 | 2.32 | 578 | 249 |
| 26 | 13 | 3.01 | 0.69 | 2.32 | 585 | 252 |
| 27 | 14 | 3.01 | 0.71 | 2.30 | 605 | 263 |
| 28 | 14 | 3.01 | 0.69 | 2.32 | 616 | 266 |
| 29 | 15 | 3.01 | 0.72 | 2.29 | 612 | 267 |
| 30 | 15 | 3.01 | 0.72 | 2.29 | 634 | 277 |

X (MEAN) . . . 275
S (STD. DEVIATION) . . . 33
N (SAMPLE SIZE) . . . 30
*OBTAINED FROM DIVIDING THE ULTIMATE PULL-OUT VALUE BY THE PENETRATION DEPTH. THIS ELIMINATES VARIANCES RESULTING FROM DIFFERENCES IN THE FASTENER PENETRATION DEPTH.

TABLE C
S-P-F TESTS - FIRST GROUP OF WIRE NAILS ACCORDING TO PRIOR ART

| NAIL SAMPLE NUMBER | S-P-F BOARD NUMBER | FASTENER LENGTH (IN.) | STANDING HEIGHT (IN.) | PENETRATION DEPTH (INS.) | ULTIMATE PULL-OUT VALUE (LBS.) | ADJUSTED PULL-OUT VALUE* (LBS./IN.) |
|---|---|---|---|---|---|---|
| 1 | 1 | 2.99 | 0.72 | 2.27 | 537 | 237 |
| 2 | 1 | 2.99 | 0.71 | 2.28 | 576 | 253 |
| 3 | 2 | 2.98 | 0.73 | 2.25 | 655 | 291 |
| 4 | 2 | 2.99 | 0.72 | 2.27 | 593 | 261 |
| 5 | 3 | 2.98 | 0.70 | 2.28 | 616 | 270 |
| 6 | 3 | 2.98 | 0.72 | 2.26 | 534 | 236 |
| 7 | 4 | 2.99 | 0.70 | 2.29 | 603 | 263 |
| 8 | 4 | 2.99 | 0.73 | 2.26 | 632 | 280 |
| 9 | 5 | 2.99 | 0.70 | 2.29 | 482 | 210 |
| 10 | 5 | 2.97 | 0.71 | 2.26 | 502 | 222 |
| 11 | 6 | 2.99 | 0.70 | 2.29 | 654 | 286 |
| 12 | 6 | 2.99 | 0.71 | 2.28 | 730 | 320 |
| 13 | 7 | 2.98 | 0.72 | 2.26 | 617 | 273 |
| 14 | 7 | 2.99 | 0.73 | 2.26 | 662 | 293 |
| 15 | 8 | 2.97 | 0.68 | 2.29 | 529 | 231 |
| 16 | 8 | 2.99 | 0.72 | 2.27 | 623 | 274 |
| 17 | 9 | 2.98 | 0.69 | 2.29 | 567 | 248 |
| 18 | 9 | 2.99 | 0.69 | 2.30 | 616 | 269 |
| 19 | 10 | 2.99 | 0.68 | 2.31 | 602 | 261 |
| 20 | 10 | 2.97 | 0.69 | 2.28 | 618 | 271 |
| 21 | 11 | 2.99 | 0.72 | 2.27 | 557 | 245 |
| 22 | 11 | 2.98 | 0.70 | 2.28 | 588 | 258 |
| 23 | 12 | 2.99 | 0.68 | 2.31 | 570 | 247 |
| 24 | 12 | 2.97 | 0.66 | 2.31 | 559 | 242 |
| 25 | 13 | 2.98 | 0.68 | 2.30 | 518 | 225 |
| 26 | 13 | 2.98 | 0.66 | 2.32 | 507 | 219 |
| 27 | 14 | 2.98 | 0.69 | 2.29 | 546 | 238 |
| 28 | 14 | 2.99 | 0.68 | 2.31 | 513 | 222 |
| 29 | 15 | 3.00 | 0.71 | 2.29 | 512 | 224 |
| 30 | 15 | 2.99 | 0.70 | 2.29 | 540 | 236 |

X (MEAN) . . . 254
S (STD. DEVIATION) . . . 26
*OBTAINED FROM DIVIDING THE ULTIMATE PULL-OUT VALUE BY THE PENETRATION DEPTH. THIS ELIMINATES VARIANCES RESULTING FROM DIFFERENCES IN THE FASTENER PENETRATION DEPTH.

EXAMPLE TWO
Oak Tests

A second group of such nails according to the preferred embodiment of this invention and a second group of such nails according to the prior art were driven into Oak boards. The Oak boards were selected to have close similarities in grain structure, which was judged visually at the board ends, in specific gravity, which ranged from about 0.67 to about 0.73 inclusive, and in moisture content, which ranged from about 31% to about 40% inclusive. Each such Oak board had a grain structure similar to the grain structure shown in FIG. 8B; boards having grain structures similar to any of the grain structures shown in FIGS. 8A, 8C, and 8D were rejected.

Three nails from the second group of such nails according to the preferred embodiment of this invention and three nails from the second group of such nails according to the prior art were driven into each of ten such Oak boards by the Paslode ™ Model 5350S pneumatically powered nailing tool noted above. The same tool, which was operated at a tool pressure of 100 psi, was used to drive each such nail.

Withdrawal force for each such nail was measured by means of the Tinius Olsen Super "L" testing machine noted above, within a few hours after such same nail had been driven.

Figure 10:
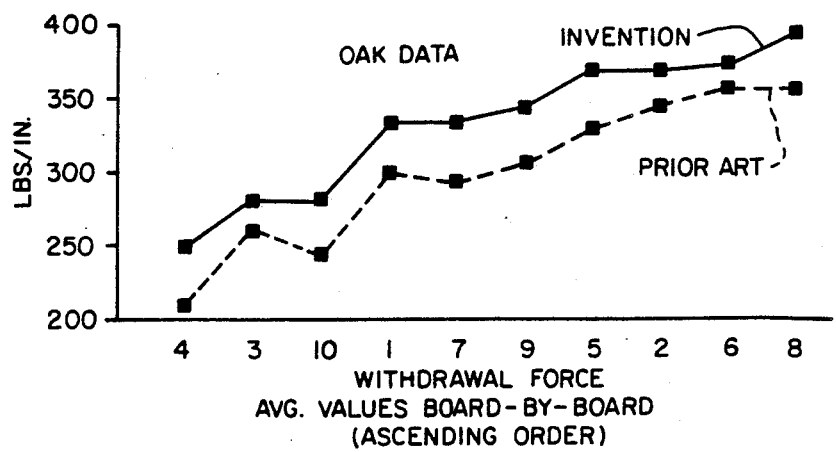

Wood conditions were as tabulated in Table D below.

head popping or shank breaking was observed. Some of such date are abstracted in FIG. 10, which plots average (mean) values of withdrawal forces (in pounds per inch) for individual Oak boards, in ascending order, and in which the upper plot represents such values (in ascending order) for the Oak boards and tested nails according to the preferred embodiment of this invention and the lower plot represents such values for the same boards and tested nails according to the prior art.

TABLE D

|  | Board No. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Moisture (%) | 37 | 34 | 33 | 40 | 31 | 34 | 38 | 39 | 34 | 32 |
| Specific Gravity | 0.69 | 0.72 | 0.67 | 0.67 | 0.72 | 0.73 | 0.68 | 0.70 | 0.67 | 0.72 |

TABLE E

OAK TESTS - SECOND GROUP OF WIRE NAILS ACCORDING TO PREFERRED EMBODIMENT OF THIS INVENTION

| NAIL SAMPLE NUMBER | OAK BOARD NUMBER | FASTENER LENGTH (IN.) | STANDING HEIGHT (IN.) | PENETRATION DEPTH (IN.) | ULTIMATE PULL-OUT VALUE (LBS.) | ADJUSTED PULL-OUT VALUE* (LBS./IN.) |
| --- | --- | --- | --- | --- | --- | --- |
| 1 | 1 | 3.01 | 0.73 | 2.28 | 750 | 329 |
| 2 | 1 | 3.01 | 0.75 | 2.26 | 743 | 329 |
| 3 | 1 | 3.00 | 0.75 | 2.25 | 769 | ++ 342 |
| 4 | 2 | 3.01 | 0.74 | 2.27 | 845 | ++ 372 |
| 5 | 2 | 3.01 | 0.79 | 2.22 | 799 | ++ 360 |
| 6 | 2 | 3.01 | 0.77 | 2.24 | 843 | 376 |
| 7 | 3 | 3.00 | 0.74 | 2.26 | 647 | 286 |
| 8 | 3 | 3.00 | 0.75 | 2.25 | 628 | 279 |
| 9 | 3 | 3.01 | 0.74 | 2.27 | 634 | 279 |
| 10 | 4 | 3.00 | 0.74 | 2.26 | 492 | + 218 |
| 11 | 4 | 3.00 | 0.77 | 2.23 | 538 | + 241 |
| 12 | 4 | 3.00 | 0.79 | 2.21 | 634 | 287 |
| 13 | 5 | 2.99 | 0.79 | 2.20 | 845 | ++ 384 |
| 14 | 5 | 3.01 | 0.78 | 2.23 | 830 | ++ 372 |
| 15 | 5 | 3.00 | 0.76 | 2.24 | 785 | +++ 350 |
| 16 | 6 | 3.00 | 0.78 | 2.22 | 852 | + 384 |
| 17 | 6 | 3.01 | 0.78 | 2.23 | 814 | ++ 365 |
| 18 | 6 | 3.01 | 0.78 | 2.23 | 847 | 380 |
| 19 | 7 | 3.01 | 0.75 | 2.26 | 766 | 339 |
| 20 | 7 | 3.00 | 0.75 | 2.25 | 738 | + 328 |
| 21 | 7 | 3.01 | 0.74 | 2.27 | 727 | 320 |
| 22 | 8 | 3.01 | 0.77 | 2.24 | 869 | ++ 388 |
| 23 | 8 | 3.01 | 0.76 | 2.25 | 899 | ++ 400 |
| 24 | 8 | 3.01 | 0.77 | 2.24 | 861 | ++ 384 |
| 25 | 9 | 3.01 | 0.73 | 2.28 | 807 | ++ 354 |
| 26 | 9 | 3.01 | 0.75 | 2.26 | 750 | ++ 332 |
| 27 | 9 | 3.01 | 0.76 | 2.25 | 732 | 325 |
| 28 | 10 | 3.01 | 0.73 | 2.28 | 638 | 280 |
| 29 | 10 | 3.01 | 0.76 | 2.25 | 638 | ++ 284 |
| 30 | 10 | 3.01 | 0.73 | 2.28 | 655 | + 287 |

+ WOOD SPLIT < 0.015 IN.
++ WOOD SPLIT 0.015-0.030 IN.
±++WOOD SPLIT > 0.030 IN.
X (MEAN) ... 332
S (STD. DEVIATION) ... 47
N (SAMPLE SIZE) ... 30
*OBTAINED FROM DIVIDING THE ULTIMATE PULL-OUT VALUE BY THE PENETRATION DEPTH. THIS ELIMINATES VARIANCES RESULTING FROM DIFFERENCES IN THE FASTENER PENETRATION DEPTH.

The data tabulated in Tables E and F below were obtained. Wood splits, when observed, were noted. No The following data were obtained for the second group of wire nails according to the prior art:

TABLE F

OAK TESTS - SECOND GROUP OF WIRE NAILS ACCORDING TO PRIOR ART

| NAIL SAMPLE NUMBER | OAK BOARD NUMBER | FASTENER LENGTH (IN.) | STANDING HEIGHT (IN.) | PENETRATION DEPTH (IN.) | ULTIMATE PULL-OUT VALUE (LBS.) | ADJUSTED PULL-OUT VALUE* (LBS./IN.) |
| --- | --- | --- | --- | --- | --- | --- |
| 1 | 1 | 2.98 | 0.75 | 2.23 | 640 | + 287 |
| 2 | 1 | 2.97 | 0.76 | 2.21 | 718 | + 325 |
| 3 | 1 | 2.97 | 0.76 | 2.21 | 633 | + 286 |
| 4 | 2 | 2.98 | 0.78 | 2.20 | 777 | ++ 353 |

TABLE F-continued

OAK TESTS - SECOND GROUP OF WIRE NAILS ACCORDING TO PRIOR ART

| NAIL SAMPLE NUMBER | OAK BOARD NUMBER | FASTENER LENGTH (IN.) | STANDING HEIGHT (IN.) | PENETRATION DEPTH (IN.) | ULTIMATE PULL-OUT VALUE (LBS.) | ADJUSTED PULL-OUT VALUE* (LBS./IN.) |
|---|---|---|---|---|---|---|
| 5  | 2  | 2.98 | 0.76  | 2.22 | 711 | ++ 320 |
| 6  | 2  | 2.99 | 0.76  | 2.23 | 797 | + 357  |
| 7  | 3  | 2.99 | 0.76  | 2.23 | 563 | 252    |
| 8  | 3  | 2.98 | 0.73  | 2.25 | 588 | 261    |
| 9  | 3  | 2.99 | 0.74  | 2.25 | 606 | + 269  |
| 10 | 4  | 2.99 | 0.72  | 2.27 | 445 | 196    |
| 11 | 4  | 2.98 | ·0.73 | 2.25 | 483 | 215    |
| 12 | 4  | 2.99 | 0.74  | 2.25 | 480 | 213    |
| 13 | 5  | 2.98 | 0.78  | 2.20 | 736 | ++ 335 |
| 14 | 5  | 2.99 | 0.77  | 2.22 | 697 | + 314  |
| 15 | 5  | 2.97 | 0.77  | 2.20 | 742 | ++ 337 |
| 16 | 6  | 2.98 | 0.76  | 2.22 | 786 | 354    |
| 17 | 6  | 2.98 | 0.78  | 2.20 | 791 | ++ 360 |
| 18 | ·6 | 2.98 | 0.77  | 2.21 | 834 | + 377  |
| 19 | 7  | 2.98 | 0.73  | 2.25 | 665 | 296    |
| 20 | 7  | 2.99 | 0.73  | 2.26 | 656 | 290    |
| 21 | 7  | 2.98 | 0.74  | 2.24 | 612 | 273    |
| 22 | 8  | 2.98 | 0.74  | 2.24 | 780 | + 348  |
| 23 | 8  | 2.98 | 0.76  | 2.22 | 807 | 364    |
| 24 | 8  | 2.99 | 0.79  | 2.20 | 783 | + 356  |
| 25 | 9  | 2.99 | 0.75  | 2.24 | 688 | 307    |
| 26 | 9  | 2.98 | 0.75  | 2.23 | 676 | + 303  |
| 27 | 9  | 2.99 | 0.75  | 2.24 | 792 | + 354  |
| 28 | 10 | 2.99 | 0.74  | 2.25 | 523 | 232    |
| 29 | 10 | 2.99 | 0.75  | 2.24 | 567 | 253    |
| 30 | 10 | 2.99 | 0.72  | 2.27 | 552 | 243    |

+WOOD SPLIT < 0.015 IN.
++ WOOD SPLIT 0.015-0.030 IN.
±++ WOOD SPLIT > 0.030 IN.
X̄ (MEAN) . . . 303
S (STD. DEVIATION) . . . 52
N (SAMPLE SIZE) . . . 30
*OBTAINED FROM DIVIDING THE ULTIMATE PULL-OUT VALUE BY THE PENETRATION DEPTH. THIS ELIMINATES VARIANCES RESULTING FROM DIFFERENCES IN THE FASTENER PENETRATION DEPTH.

CONCLUSIONS

The foregoing data indicate that wire nails according to the preferred embodiment of this invention, as described above, tend to exhibit greater resistance to withdrawal, when tested with S-P-F and Oak boards, as compared to wire nails according to the prior art as formed with standard points. Variations in the foregoing data are believed to be largely attributable to natural variations among the S-P-F boards and to natural variations among the Oak boards.

I claim:

1. A wire nail having a shank with opposite ends, a head formed on one of the ends, and a point formed on the other end, the shank defining an axis;
   the point having a penetrating portion, which is blunt, a wedging portion, which merges with and tapers toward the penetrating portion, and a transitional portion, which merges with and tapers toward the wedging portion and merges with the last-mentioned end of the shank;
   the wedging portion defining plural straight edges, each of which is inclined at a given angle relative to the axis defined by the shank;
   the wedging portion having a plurality of convex surfaces, each of which conforms generally to a section of a circular cylinder, and two of which meet at each of said edges defined by the wedging portion;
   the transitional portion defining plural straight edges, each of which meets a different one of said edges defined by the wedging portion, and each of which is inclined at a lesser angle relative to the axis defined by the shank; and
   the transitional portion having a plurality of convex surfaces, each of which conforms generally to a section of a circular cylinder, and two of which meet at each of said edges defined by the transitional portion.

2. A wire nail having a shank with opposite ends, a head formed on one of the ends, and a point formed on the other end, the shank defining an axis;
   the point having a penetrating portion, which is blunt, a wedging portion, which merges with and tapers toward the penetrating portion, and a transitional portion, which merges with and tapers toward the wedging portion and merges with the last-mentioned end of the shank;
   the wedging portion defining four straight edges, each of which is inclined at an acute angle relative to the axis defined by the shank;
   the wedging portion having a plurality of convex surfaces, each of which conforms generally to a section of a circular cylinder, and two of which meet at each of said edges defined by the wedging portion;
   the transitional portion defining four straight edges, each of which meets a different one of said edges defined by the wedging portion, and each of which is inclined at a lesser angle relative to the axis defined by the shank; and
   the transitional portion having a plurality of convex surfaces, each of which conforms generally to a section of a circular cylinder, and two of which meet at each of said edges defined by the transitional portion.

3. The wire nail of claim 2 wherein each of the penetrating, wedging, and transitional portions of the point is elongate in cross-section, and asymmetrical about the axis defined by the shank.

4. The wire nail of claim 2 wherein the acute angle is about 12½° and the lesser angle is about 10°.

5. The wire nail of claim 3 wherein the acute angle is about 12½° and the lesser angle is about 10°.

6. The wire nail of claim 2 having a cutting tip formed on the penetrating portion.

7. The wire nail of claim 6 wherein the cutting tip is formed as a thin rib extended across the penetrating portion.

8. The wire nail of claim 7 having a pair of thin cutting ribs extended from the cutting tip and formed along the wedging portion.

9. The wire nail of claim 8 wherein each of the cutting ribs is formed along the transitional portion as well as along the wedging portion.

10. The wire nail of claim 9 wherein the ribs are formed with substantially square edges.

11. The wire nail of claim 8 wherein each of the cutting ribs extends about equally between two of said edges defined by the wedging portion.

12. The wire nail of claim 11 wherein each of the cutting ribs extends along the transitional portion, about equally between two of said edges defined by the transitional portion, as well as along the wedging portion.

13. The wire nail of claim 2 wherein each of the penetrating, wedging, and transitional portions of the point is elongate in cross-section, and asymmetrical about the axis defined by the shank, wherein the acute angle is about 12½° and the lesser angle is about 10°, the wire nail having a cutting tip formed on the penetrating portion as a thin rib extended across the penetrating portion and having a pair of thin cutting edges, each of which is extended from the cutting tip and formed along the wedging portion, and along the transitional portion, about equally between two of said edges defined by the wedging portion and about equally between two of said edges defined by the transitional portion.

* * * * *